Feb. 25, 1947.  A. C. RUGE  2,416,664
STRAIN RESPONSIVE APPARATUS
Filed July 25, 1944  2 Sheets-Sheet 1
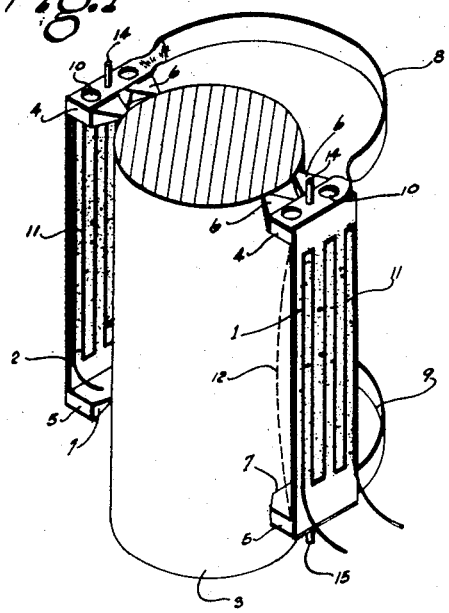
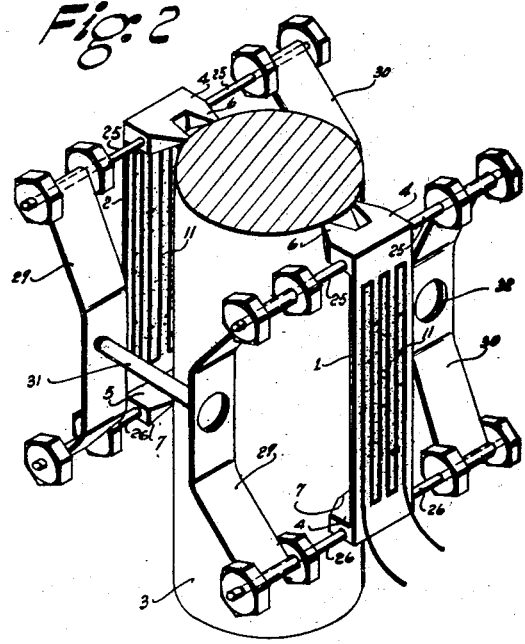
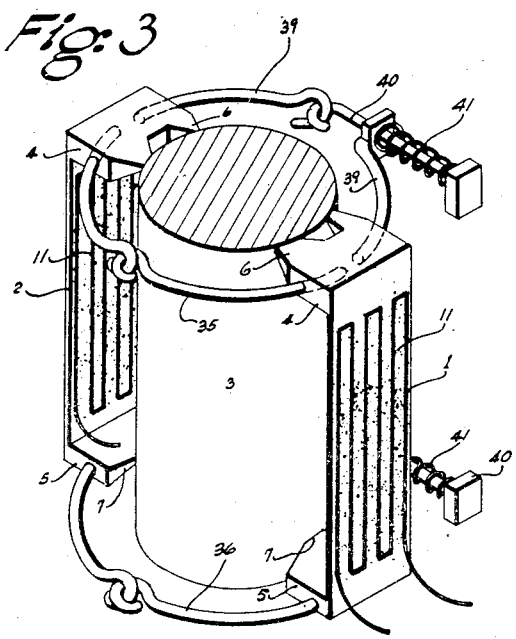
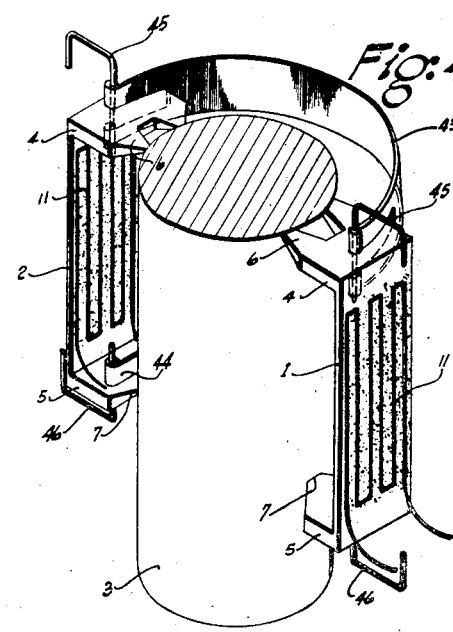
INVENTOR
Arthur C. Ruge
BY Edward Hathaway
ATTORNEY Feb. 25, 1947.  A. C. RUGE  2,416,664
STRAIN RESPONSIVE APPARATUS
Filed July 25, 1944  2 Sheets-Sheet 2
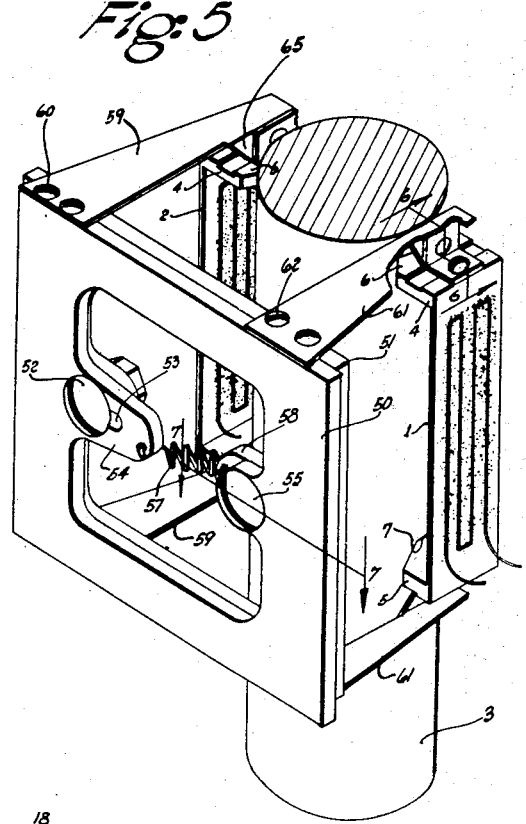
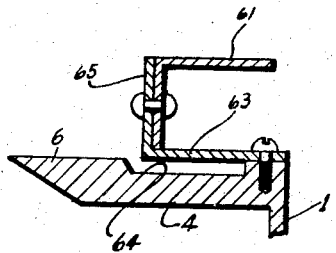
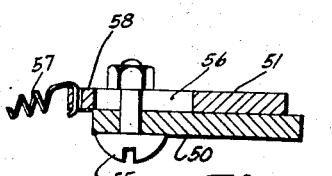
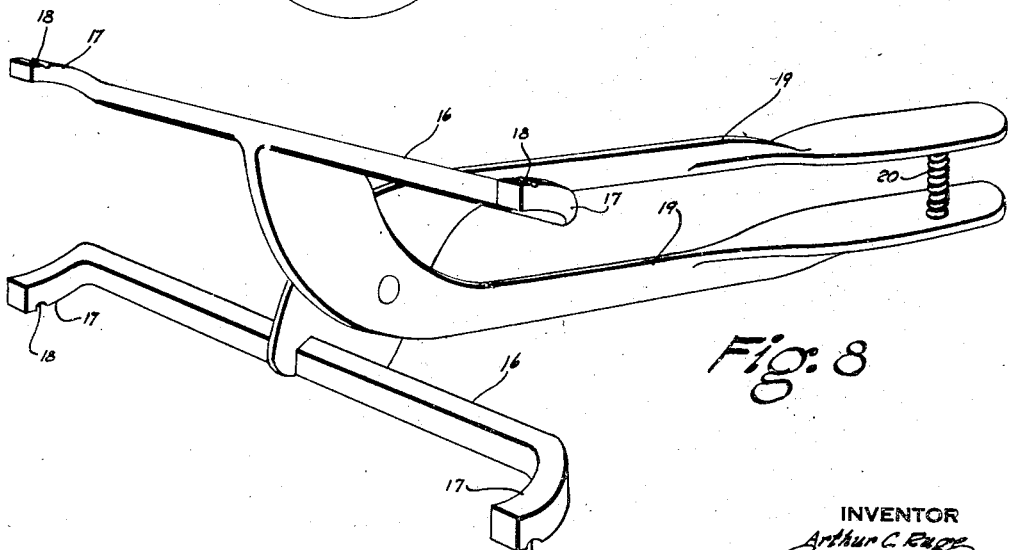
INVENTOR
Arthur C. Ruge
BY
ATTORNEY Patented Feb. 25, 1947

2,416,664

UNITED STATES PATENT OFFICE 2,416,664

STRAIN RESPONSIVE APPARATUS

Arthur C. Ruge, Cambridge, Mass., assignor to
The Baldwin Locomotive Works, a corporation
of Pennsylvania Application July 25, 1944, Serial No. 546,551

5 Claims. (Cl. 201—63)

This invention relates generally to strain responsive apparatus and more particularly to extensometers that may be employed either for determining strain of a specimen stressed in a materials testing machine or as an element of a dynamometer.

Many different types and constructions of extensometers have been heretofore proposed and used but their complications either structurally or functionally have imposed certain limitations upon their scope of use or convenience of application and frequently involved a relatively high initial cost as well as considerable care in handling the same to avoid damaging the precision qualities thereof.

Such prior art extensometers have been of mechanical, optical and electrical contact types whereas in my present invention I employ an electrical strain sensitive gage consisting of a bonded fine wire filament such as generally disclosed in Simmons Patent 2,292,549 and my Patent 2,350,972. These patents may be considered, for the purpose of the disclosure herein, to describe the specific construction and operation of the gage per se used herein as well as describing certain of the circuits among others for measuring the change in electrical resistance of the bonded wire or of utilizing the change in resistance to control a desired circuit.

It is an object of my invention to provide an improved electrical strain responsive device that can be readily attached to a member subject to variations in strain and cause the electrical strain sensitive element to operate with a high degree of accuracy and sensitivity in response to changes in strain in the member.

A more specific object is to provide an improved extensometer that is constructed and arranged so as to have a high degree of flexibility of manipulation and ease of application to a specimen or member subject to strain and to embody in such construction a thin strain sensitive section or portion which, notwithstanding its thinness, is supported in a relatively rugged manner without sacrifice of sensitivity or accuracy.

Other objects and advantages will be more apparent to those skilled in the art from the following description of the accompanying drawing in which:

Figs. 1 to 5 are various modifications of my improved strain responsive device;

Fig. 6 is a fragmentary section taken substantially on the line 6—6 of Fig. 5;

Fig. 7 is a fragmentary section taken substantially on the line 7—7 of Fig. 5; and Fig. 8 is a perspective of a tool for conveniently applying or removing the strain responsive device shown in Fig. 1.

In the particular embodiments of the invention disclosed herein for purposes of illustration, I have shown my device in Fig. 1 as comprising a pair of elongated flexible strain responsive elements I and 2 which are identical to each other except that they are disposed to engage opposite sides of a member 3 subject to strain such as a materials testing specimen. Hence the description of one element will suffice for both. The strain responsive element is relatively thin and preferably of narrow width compared to its length. It terminates in relatively heavy nonflexible upper and lower heads 4 and 5 provided with any suitable shape or form of gage points which broadly includes usual conical points or knife edges which, for purposes of illustration, are shown at the upper end as two short knife edges fitted tangent to the surface of specimen 3 and at the lower end as a single short knife edge tangent to the surface of specimen 3. The relative positions of the opposed knife edges may be reversed from that shown, if desired, in order to secure more perfect alignment of the gages on the specimen. The upper and lower sets of gage points are spaced apart any desired predetermined gage distance and the elastic characteristics of the thin portion I is such as to always insure that such spacing is accurately maintained when the extensometer is initially placed on the specimen. It is an added advantage of my extensometer that the exact spacing of the engaging points can be set or checked precisely merely by observing the reading of the associated electrical indicating device.

The two strain responsive members I and 2 are resiliently held in operative relation to each other by upper and lower flexible bands 8 and 9 whose ends are twisted to a flat position and secured by screws 10 to the upper and lower heads 4 and 5. The spring members 8 and 9 cause the gage points 6 and 7 to grip or clamp the specimen with a predetermined uniform pressure as well as allowing the extensometer to be easily expanded or contracted in applying or removing the same from the specimen 3.

The electrical gage employs impedance means, specifically in the form of a fine electrical conducting wire 11 such as disclosed in said patents bonded throughout its effective length to the surface of the thin sections I and 2 preferably on both the inner and outer sides. The electrical resistance of the wire 11 varies in accordance with the strain of members 1 and 2, such strain in Fig. 1 being produced by bending of the thin sections in the direction of dotted line 12. This bending is produced by the movement of the gage points 6 and 7 away from each other during elongation of the specimen, i. e., a tension test, the heads 4 and 5 being sufficiently rigid to cause such flexure. In case of a compression test the gage points 6 and 7 will move toward each other thereby causing the thin sections 1 and 2 to flex outwardly. In such operations the inner and outer sets of electrical gage wires will be oppositely strained and the consequent change in resistance will be cumulative if placed in the proper arms of a measuring bridge. However, if desired, only one set of bonded wire gages may be employed on either the inner or outer sides of the flexible portions 1 and 2. Inasmuch as no appreciable force is required to strain members 1 and 2 together with their bonded wires, it is seen that an extremely simple, accurate and sensitive strain responsive device is provided.

Another advantage of my extensometer is that by properly choosing the thickness of the flexible members 1 and 2 relative to the height of heads 4 and 5 it is practical to accommodate strains of arbitrarily large or small magnitudes in member 3. And, since the associated electrical instrumentation can be made very sensitive and can easily be provided with attenuators for varying the electrical sensitivity, it is possible to measure with full accuracy over a very wide strain range. This is an advantage not possessed by mechanical or optical extensometers commonly in use today. Having no delicate levers or other critical moving parts, this extensometer is able to withstand severe shocks or jolts without damage, as compared with devices of similar sensitivity now in use. Even the fracture of specimen 3 will only cause the knife edges to slide without damage to the measuring element.

To facilitate the application or removal of the extensometer a pair of upper and lower pins 14 and 15 extend from the heads 4 and 5 and are adapted to be engaged by a suitable tool shown in Fig. 8. This tool has two arms 16 with outwardly bent fingers 17 preferably slightly recessed at 18 to engage the upper and lower pins 14 and 15 on the inner side thereof adjacent the specimen 3. These arms have pivotally connected handles 19 which may be yieldably biased outwardly by a spring 20. An operator may easily compress the handles 19 and snap the grooved fingers 17 on pins 14 and 15 which will be approached from the sides adjacent the resilient bands 8 and 9. The tool may be provided with centering stops so that the extensometer elements are exactly centered on the specimen, thus simplifying the work of application.

In Fig. 2 a pair of strain responsive members 1 and 2 identical to those shown in Fig. 1 are supported on upper and lower horizontal pivot pins 25 and 26 extending through the relatively heavy upper and lower heads 4 and 5. A pair of hinge straps 29 and 30 are mounted upon each set of hinge pins and are connected together by a pair of removable bolts 31 and 32. The operation of the flexible members 1 and 2 are identical to those of Fig. 1. A practical variation to Fig. 2 is to substitute a coiled tension spring for one of the bolts 31, using bolt 32 to act as a link. In this way the spring tension can be adjusted as delicately as desired in a simple manner.

In Fig. 3 the strain responsive members 1 and 2, against similar to those of Fig. 1, are connected together on one side by semi-circular pivotally connected links 35 and 36 secured in the upper and lower heads 4 and 5, these heads being removably connected at their sides by links such as 39 and releasable hooks 40 which are urged into a clamping position by springs 41. To release the gage it is only necessary to move hook 40 inwardly against spring 41 and thereby unhook link 39.

In Fig. 4 the two flexible strain responsive elements 1 and 2 are held by upper and lower flexible spring bands 43 and 44 whose ends are slotted and connected by upper and lower hinge pins 45 and 46 to the heads 4 and 5. The torsional restraint of spring bands 43 and 44 is so weak that the small angular movement of heads 4 and 5 is accommodated with relatively negligible forces, while at the same time adequate clamping pressure is maintained to prevent slippage of the knife edges or gage points. Hinge pins 45 and 46 are adapted for use with the tool shown in Fig. 8.

In the modification shown in Fig. 5 a pair of relatively slidable plates 50 and 51 are held in guided relation to each other by a pin and slot connection 52 and 53, the slot being formed in a suitable tongue 54 of plate 50 and the pin being held in the back plate 51. A similar pin and slot connection is provided for the other end of the plates, but in this case the pin 55 is held in plate 50 and a slot 56 is formed in plate 51. A spring 57 is cross-connected between the two tongues 54 and 58. To support the strain sensitive members 1 and 2 by these plates a pair of upper and lower arms 59 are secured by screws 60 to the outer plate 50 while a similar pair of upper and lower arms 61 are secured by screws 62 to the inner plate 51. The connections between these arms and the strain responsive members 1 and 2 are identical for each arm except that they are arranged for opposite sides of the specimen and for the upper and lower ends of the members 1 and 2. Hence the description of one will suffice for all four arms. As shown in Fig. 6 the arm 61 has a down turned flanged portion 65 to which is connected a relatively flexible angle member 63 secured to the head 4. This head is preferably recessed at 64 to allow freedom of angular movement of the heads during bending of the thin flexible portion of strain responsive elements 1 and 2. The member 62 is sufficiently thin to allow flexing of the members 1 and 2 without imposing any appreciable restraint or force upon the same. In the event of the strain responsive portion of members 1 and 2 being subjected to a direct compression or tension strain as might be caused by thermal contraction or expansion in distinction to the bending action hereinbefore mentioned, the arms 59 and 61 are sufficiently relatively thin and of such length that they will function perfectly as flexure plates to accommodate any axial elongation or contraction of members 1 and 2. It will be understood that the flange 65 is provided only at the very ends of the arms 59 and 61, the remainder thereof being a simple flat piece of sheet metal or other suitable material. Many variations in the details of this device may be made without departing from the spirit of my invention. For example, the connection detailed in Fig. 6 is but one of many possible practical arrangements, as will be obvious to those skilled in the art of instrument design. Also, the frame may be provided with fixed or adjustable centering stops to facilitate the precise centering of the extensometer upon the specimen 3. A particular advantage of the modification of Fig. 5 is that the extensometer is self-contained and will adapt itself to a wide range of specimen sizes and is very simple and quick to apply or remove. The frame may be built of light material such as Bakelite or magnesium or dural. If very delicate clamping pressure is to be used it may be desirable to provide a spring or other suitable support to take the weight of the frame off the gage points. Any of the devices illustrated may be counterbalanced if desired.

From the disclosure herein, it is seen that I have provided a relatively simple and inexpensive strain responsive device in the form of an extensometer that can be easily secured to a specimen to measure changes in strain with a high degree of accuracy, sensitivity and dependability, the device being easily calibrated as to changes in electrical resistance with respect to changes in strain.

It will of course be understood that various changes in details of construction and arrangement of parts may be made by those skilled in the art without departing from the spirit of the invention as set forth in the appended claims.

I claim:

1. A strain responsive device comprising a plurality of flexible elements each having gage points at predetermined spaced points thereof for variably straining the element in response to relative movement between the gage points, electrical resistance wires bonded throughout their length to said flexible elements so as to be subject to strains therein in response to relative movement between said gage points, and means for supporting said flexible elements in opposite relation to each other and for clamping the same on opposite sides of a member subject to strain.

2. A strain responsive device comprising a plurality of flexible elements each terminating in relatively heavy inflexible heads each of which are provided with a plurality of gage means for engaging spaced points of a member subject to strain so as to transmit strain from the member to said flexible portion, means for connecting together the heads at corresponding ends of said elements and to clamp the same on a member subject to strain in opposed relation to each other while at the same time permitting the heads on one side to have axial movement relative to the heads on the other side, and electrical means mounted on the flexible elements so as to be responsive to changes of strain therein.

3. A strain responsive device comprising a plurality of substantially similar elements having strain responsive flexible sections, means for relatively supporting the same, each of said elements having a plurality of gage means for engaging a member subject to strain, strain responsive electrical means mounted on said flexible sections so as to be responsive to the strains therein, and yieldable means for supporting said flexible sections in substantially opposed relation to each other and adapted to allow said sections to be spread apart for attachment to or removal from said member and for clamping the gage points thereto while at the same time permitting the heads on one side to have axial movement relative to the heads on the other side.

4. The combination set forth in claim 3 further characterized in that said supporting means includes a pair of relatively slidable guided plates and supporting arms carried by the respective plates to support the flexible elements.

5. The combination set forth in claim 3 further characterized in that said supporting means for connecting the opposed flexible elements together includes a pair of spring bands arranged to extend from one element to the other around one side of the member subject to strain.

ARTHUR C. RUGE.

REFERENCES CITED

The following references are of record in the file of this patent:

UNITED STATES PATENTS

| Number | Name | Date |
| --- | --- | --- |
| 1,477,602 | Simon | Dec. 18, 1923 |
| 1,608,883 | Justus | Nov. 30, 1926 |
| 2,106,696 | Lewis | Jan. 25, 1938 |
| 2,252,464 | Kearns et al. | Aug. 12, 1941 |
| 2,316,975 | Ruge | Apr. 20, 1943 |

FOREIGN PATENTS

| Number | Country | Date |
| --- | --- | --- |
| 123,664 | British | Mar. 6, 1919 |

OTHER REFERENCES

Theis "Electrical Measurement of Stresses," in Aircraft Engineering, April 1943, pp. 106–109. Copy in Div. 60.)